US009724949B2

(12) United States Patent
Fukusada et al.

(10) Patent No.: US 9,724,949 B2
(45) Date of Patent: Aug. 8, 2017

(54) PRINTING APPARATUS SYSTEM, AND CONNECTION DEVICE, CONTROL METHOD AND COMPUTER READABLE MEDIUM FOR THE SAME HAVING AUTHENTICATION PROCESS FOR IDENTIFYING CONNECTION OF MULTISTAGE CONNECTIONS

(71) Applicant: BROTHER KOGYO KABUSHIKI KAISHA, Nagoya, Aichi (JP)

(72) Inventors: Yuki Fukusada, Gifu (JP); Takashi Suzuki, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/708,447

(22) Filed: May 11, 2015

(65) Prior Publication Data
US 2015/0324673 A1 Nov. 12, 2015

(30) Foreign Application Priority Data

May 12, 2014 (JP) .................................. 2014-098709

(51) Int. Cl.
G06K 15/16 (2006.01)
B41J 29/393 (2006.01)
(Continued)

(52) U.S. Cl.
CPC ............. *B41J 29/393* (2013.01); *B41J 29/13* (2013.01); *G06K 15/408* (2013.01); *G06K 15/4025* (2013.01)

(58) Field of Classification Search
CPC .. G06K 15/4025; G06K 15/408; G06K 15/16; H04N 1/0032; H04N 1/00278; B41J 29/393; B41J 29/13
(Continued)

(56) References Cited

U.S. PATENT DOCUMENTS 5,841,362 A 11/1998 Nakamura et al.
8,879,101 B2* 11/2014 Oh ............................. 358/1.15
(Continued)

FOREIGN PATENT DOCUMENTS

JP 2000-351252 A 12/2000
JP 2003-094766 A 4/2003
(Continued)

*Primary Examiner* — Benny Q Tieu
*Assistant Examiner* — Juan M Guillermety
(74) *Attorney, Agent, or Firm* — Scully, Scott, Murphy & Presser, PC

(57) ABSTRACT

A printing apparatus system, comprising: a printing apparatus; and connection devices connected to the printing apparatus in multistage, wherein a device side controller is configured to: execute an authentication process in cooperation with an apparatus side controller when a signal is input thereto, the signal corresponding to a start command signal output from the printing apparatus and input to an electric resistance; and execute a level process where a voltage level of the start command signal passed the electric resistance is set to be higher than or equal to a predetermined level when the authentication process is finished, wherein the apparatus side controller is configured to store identification information assigned to each of the connection devices and number-of-stage information indicating, for each of the connection devices, which stage a connection device associated with the identification information is connected to, wherein the identification information is associated with the number-of-stage information.

14 Claims, 12 Drawing Sheets

(51) Int. Cl.
*G06K 15/00* (2006.01)
*B41J 29/13* (2006.01)

(58) Field of Classification Search
USPC .............................. 358/1.13, 1.15, 1.16, 1.14
See application file for complete search history.

(56) References Cited

U.S. PATENT DOCUMENTS

| | | | |
|---|---|---|---|
| 2003/0048474 A1 | 3/2003 | Hong et al. | |
| 2007/0001379 A1* | 1/2007 | Oh | B65H 3/44 271/145 |
| 2008/0055635 A1 | 3/2008 | Takahashi | |
| 2010/0020354 A1* | 1/2010 | Ito | G03G 15/6508 358/1.15 |
| 2011/0004768 A1* | 1/2011 | Cho | H04N 1/00007 713/182 |
| 2013/0212390 A1* | 8/2013 | Du | H04L 9/32 713/168 |
| 2014/0293337 A1* | 10/2014 | Hirayama | G06K 15/4025 358/1.15 |

FOREIGN PATENT DOCUMENTS

| | | |
|---|---|---|
| JP | 2005-011068 A | 1/2005 |
| JP | 2006-225108 A | 8/2006 |
| JP | 2008-080799 A | 4/2008 |

\* cited by examiner

PRINTING APPARATUS SYSTEM, AND CONNECTION DEVICE, CONTROL METHOD AND COMPUTER READABLE MEDIUM FOR THE SAME HAVING AUTHENTICATION PROCESS FOR IDENTIFYING CONNECTION OF MULTISTAGE CONNECTIONS

CROSS-REFERENCE TO RELATED APPLICATION

This application claims priority under 35 U.S.C. §119 from Japanese Patent Application No. 2014-098709, filed on May 12, 2014. The entire subject matter of the application is incorporated herein by reference.

BACKGROUND

Technical Field

The following description relates to a printing apparatus system.

Related Art

An image forming system provided with a printing apparatus configured to start an authentication process, by using a configuration having an AND gate, from an upper stage paper supply tray of two paper supply trays connected to the printing apparatus is known. The authentication process means a process for letting the printing apparatus recognize which stage a connection device, such as a paper supply tray, is physically (actually) connected to. Therefore, when the authentication process is not properly executed, failure occurs (e.g., paper is supplied from a lower stage paper supply tray regardless of the fact that the paper should be supplied form the upper stage paper supply tray).

SUMMARY

Aspects of the present invention are advantageous in that they provide at least one of a printing apparatus system, and a connection device, a control method and a computer readable medium for the printing apparatus system in which a plurality of connection devices are connectable to the printing apparatus, which are capable of properly starting an authentication process using a simple configuration.

According to an aspect of the invention, there is provided a printing apparatus system, comprising: a printing apparatus; and a plurality of connection devices connected to the printing apparatus in multistage. The printing apparatus comprises: an apparatus side connector configured to be connected to one of the plurality of connection devices; an apparatus side communication unit configured to communicate with the plurality of connection devices; an apparatus side storage unit; and an apparatus side controller. Each of the plurality of the connection devices comprises: a device side output connector configured to be connected to one of others of the plurality of connection devices; a device side input connector configured to be connected to one of the apparatus side connector and the device side output connector of one of the others of the plurality of connection devices; a device side storage unit; a device side communication unit configured to communicate with the printing apparatus; an electric resistance connecting the device side output connector to the device side input connector; and a device side controller. In this configuration, the device side controller is configured to: execute an authentication process in cooperation with the apparatus side controller when a signal is input to the device side controller, the signal corresponding to a start command signal which is output from the printing apparatus and is input to the electric resistance; and execute a level process in which a voltage level of the start command signal which has passed the electric resistance is set to be higher than or equal to a predetermined level when the authentication process is finished. The apparatus side controller is configured to store, in the apparatus side storage unit based on the authentication process and the level process, identification information assigned to each of the plurality of connection devices and number-of-stage information indicating, for each of the plurality of connection devices, which stage a connection device associated with the identification information is connected to, wherein the identification information is associated with the number-of-stage information.

BRIEF DESCRIPTION OF THE ACCOMPANYING DRAWINGS

DETAILED DESCRIPTION

Hereafter, embodiments according to the invention will be described with reference to the accompanying drawings.

First Embodiment

Figure 1:
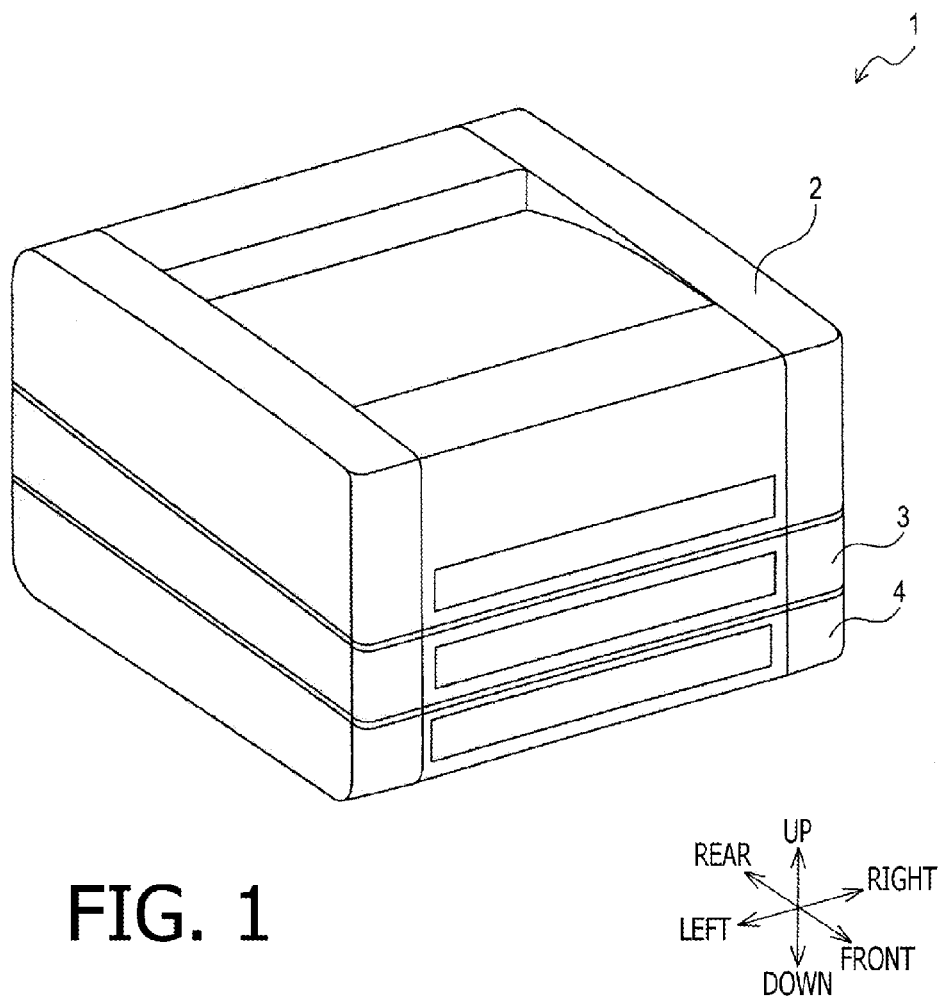
FIG. 1 is a perspective view of a printing apparatus system according to a first embodiment.

1. Outline of Printing Apparatus System
1.1 Printing Apparatus System
As shown in FIG. 1, a printing apparatus system 1 according to a first embodiment includes a printing apparatus 2 and a plurality of connection devices 3 and 4. In the following, explanation is given for a case where two connection devices are connectable to the printing apparatus 2 by way of example.

The printing apparatus 2 forms an image on a sheet, such as a sheet of paper. The connection devices 3 and 4 are optional devices which operate in a state of being connected to the printing apparatus 2 in series and in multistage. The connection devices 3 and 4 according to the embodiment are paper supply trays on which sheets to be supplied to the printing apparatus 2 are placed. In the following, the connection devices are also referred to as a first connection device 3 and a second connection device 4, respectively, in the order closer to the printing apparatus 2.

1.2 Printing Apparatus

Figure 2:
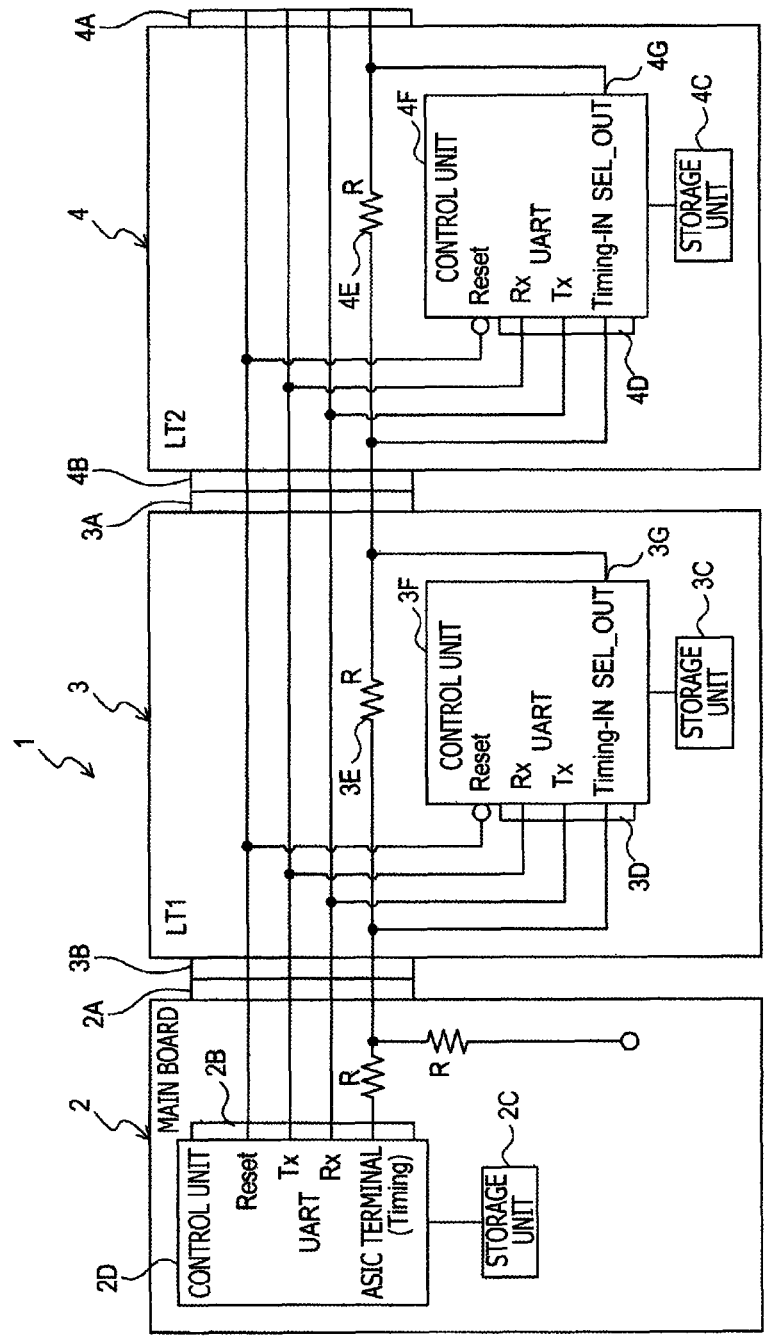
FIG. 2 is a block diagram of the printing apparatus system according to the first embodiment.

As shown in FIG. 2, the printing apparatus 2 includes an apparatus side connection unit 2A, an apparatus side communication unit 2B, an apparatus side storage unit 2C and an apparatus side control unit 2D. The apparatus side connection unit 2A is a connector which connects the connection devices 3 and 4 with the printing apparatus 2. The apparatus side control unit 2D executes communication with the connection devices 3 and 4 via the apparatus side communication unit 2B.

The apparatus side control unit 2D controls the apparatus side communication unit 2B and the apparatus side storage unit 2C. The apparatus side control unit 2D is constituted by a microcomputer in which various components, such as a CPU (Central Processing Unit), a ROM (Read Only Memory) and a RAM (Random Access Memory), are embedded. The apparatus side control unit 2D (CPU) controls various components, such as the apparatus side communication unit 2B, in accordance with a program stored in advance in a non-volatile memory (e.g., a ROM).

The apparatus side storage unit 2C is capable of storing at least the following information. That is, the apparatus side control unit 2D stores, in the apparatus side storage unit 2C, relating information in which identification information I1 associated with each of the connection devices 3 and 4 is related to number-of-stage information I2. The number-of-stage information I2 indicates which stage each of the connection devices 3 and 4 is disposed at.

The identification information I1 means unique information assigned to each of the connection devices 3 and 4. The number-of-stage information I2 is, for example, "LT1" indicating the first stage or "LT2" indicating the second stage.

1.3 Connection Device

The connection device 3 includes a device side output connection unit 3A, a device side input connection unit 3B, a device side storage unit 3C, a device side communication unit 3D, an electric resistance 3E and a device side control unit 3F. The connection device 4 includes a device side output connection unit 4A, a device side input connection unit 4B, a device side storage unit 4C, a device side communication unit 4D, an electric resistance 4E and a device side control unit 4F.

Each of the device side output connection units 3A and 4A is a connector for connecting with another connection device. Each of the device side input connection units 3B and 4B is a connector capable of connecting with one of the apparatus side connection unit 2A and the device side output connection units 3A and 4A.

In the example shown in FIG. 2, the device side input connection unit 3B of the first connection device 3 is connected to the apparatus side connection unit 2A, and the device side output connection unit 3A of the first connection device 3 is connected to the device side input connection unit 4B of the second connection device 4.

Each of the device side storage units 3C and 4C stores information. In this embodiment, each of the device side storage units 3C and 4C is constituted by a volatile memory, such as a RAM. Therefore, when a voltage supplied to the connection devices 3 and 4 becomes lower than a predetermined voltage, the information stored in the device side storage units 3C and 4C disappear.

The electric resistance 3E connects the device side input connection unit 3B and the device side output connection unit 3A. The electric resistance 4E connects the device side input connection unit 4B and the device side output connection unit 4A. Each of the device side control units 3F and 4F executes operation control and an authentication process for the connection devices 3 and 4, respectively, in cooperation with the apparatus side control unit 2D.

Each of the device side control units 3D and 4D is constituted by a microcomputer in which various components, such as a CPU, a ROM and a RAM, are embedded. The device side control unit 3D (4D) (CPU) executes the operation control and the authentication process for the connection device 3 (4) in accordance with a program stored in advance in a non-volatile memory (e.g., a ROM).

The device side control unit 3D (4D) executes communication with the printing apparatus 2 (the apparatus side control unit 2D) via the device side communication unit 3D (4D) when a process (e.g., the authentication process) is executed in cooperation with the apparatus side control unit 2D. The term authentication process means a process allowing the printing apparatus 2 to recognize which position the connection device 3 or 4 connected to the printing apparatus 2 is physically (actually) disposed at.

That is, in the authentication process, the identification information I1 associated with each of the connection devices 3 and 4 is related to the number-of-stage information I2. After the authentication process is completed, the apparatus side control unit 2D identifies the connection devices 3 and 4 using the identification information I1 and outputs an operation command.

Since, in this embodiment, each of the connection devices 3 and 4 is a paper supply tray, a command which the apparatus side control unit 2D outputs to the connection devices 3 and 4 is primarily a command for sending out a sheet. Therefore, if the authentication process is not properly executed, a problem may arise that a sheet of paper is supplied from a paper supply tray connected to a lower stage regardless of the fact that a paper supply tray connected to an upper stage should be used to supply a sheet of paper.

In this respect, according to the embodiment, the device side control unit 3F (4F) executes the authentication process Prl in cooperation with the apparatus side control unit 2D when (a) a signal Tir corresponding to a start command signal Ti which is output by the printing apparatus 2 and is input to the electric resistance 3E (4E) is inputted thereto, and (b) an instruction signal Ci output by the printing apparatus 2 is input thereto.

In this case, the timing when the start command signal Ti (the signal Tir) or the instruction signal Ci is input to the device side control unit 3F or 4F is not considered. That is, any of the start command signal Ti (the signal Tir) or the instruction signal Ci may be input to the device side control unit 3F or 4F earlier. When both of the start command signal Ti (the signal Tir) and the instruction signal Ci are finally input to the device side control unit 3F (4F), the authentication process is started.

The start command signal Ti is output from "ASIC terminal (Timing)" of the apparatus side communication unit 2B. The start command signal Ti output from the printing apparatus 2 branches in the connection device 3 (4), and is input to the electric resistance 3E (4E) and "Timing-IN" of the device side communication unit 3D (4D).

In this embodiment, the start command signal Ti itself is input to the device side control unit 3F (4F) as "the signal Tir corresponding to the start command signal Ti". It should be noted that, however, a signal uniquely corresponding to the start command signal Ti can be sufficiently used as the signal Tir input to the device side control units 3F and 4F. In this embodiment, the start command signal Ti is a signal (hereafter, also referred to as a High signal) whose voltage level is a predetermined level or more.

The instruction signal Ci is output from "output part (Tx) of UART". The instruction signal Ci output from the printing apparatus 2 is input to "input part (Rx) of UART" of the device side communication units 3D and 4D. In this embodiment, the instruction signal Ci is a signal (hereafter, also referred to as a Low signal) whose voltage level is lower than a predetermined level. It should be noted that the instruction signal Ci may be a signal having a predetermined pattern including a plurality of low signal pulses and a plurality of high signal pulses.

When the authentication process is finished, the device side control unit 3F (4F) executes a level process where a voltage level of the start command signal Ti passed through the electric resistance 3E (4E) is brought to a level larger than or equal to a predetermined level. In the level process according to the embodiment, the connection terminal 3G (4G) of the device side control unit 3F (4F) is set to Hi-z (high impedance) or a High level. The connection terminal 3G (4G) is a connection terminal (SEL_OUT in FIG. 2) for connecting the device side control unit 3F (4F) with the electric resistance 3E (4E) from the side close to the device side output connection unit 3A (4A).

2. Control of Print Device System 2.1 Main Control

Figure 3:
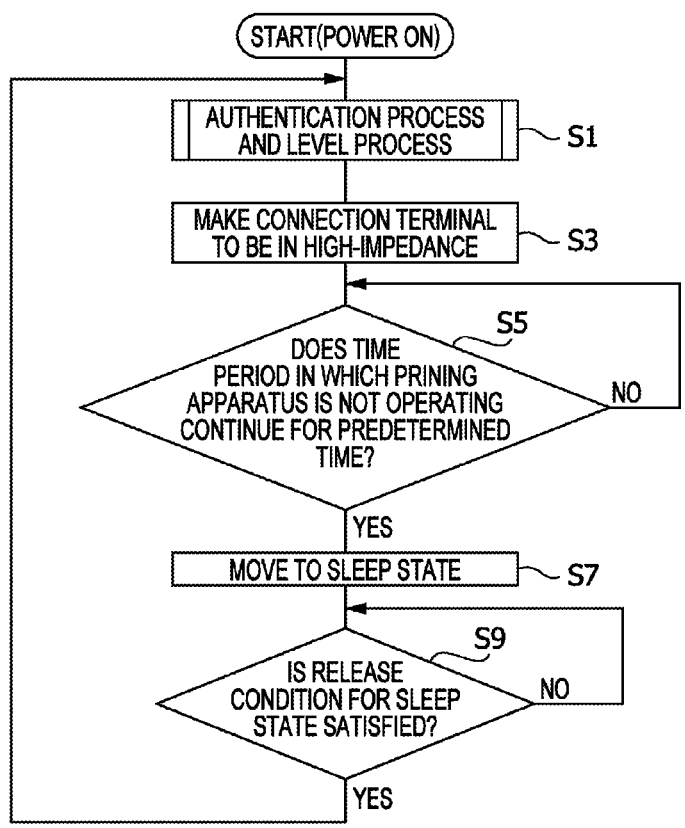
FIG. 3 is a flow chart illustrating main control of the printing apparatus system according to the first embodiment.

A main control of the print device system 1 shown in FIG. 3 is executed under control of the apparatus side control unit 2D of the printing apparatus 2. A program for executing the main control has been stored in advance in a non-volatile memory (e.g., a ROM) provided in the printing apparatus 2 (the apparatus side control unit 2D).

When a power switch of the printing apparatus system 1 is turned ON (i.e., a power switch of the printing apparatus 2 is turned ON), the program for executing the main control is loaded into the apparatus side control unit 2D (CPU).

That is, when the power switch is turned ON, the above described authentication process and the level process are executed (S1). Then, the device side control units 3F and 4F set the connection terminals 3G and 4G to Hi-z.

After the connection terminals 3G and 4G are set to Hi-z, it is possible for the device side communication unit 3D (4D) to receive a signal (e.g., a clock signal relating to signal timings) transmitted from the ASIC terminal without being affected by the electric resistances 3E and 4E. That is, it becomes possible to use the ASIC terminal as a terminal outputting a signal other than a signal for the authentication process.

The instruction signal Ci is received by each of the first connection device 3 and the second connection device 4. However, the start command signal Ti is received by only the connection device 3. Therefore, the authentication process is executed on the first connection device 3, but is not executed on the second connection device 4.

When the printing apparatus 2 (the apparatus side control unit 2D) receives an ACK signal indicating completion of the authentication process on the first connection device 3 or the second connection device 4, the apparatus side control unit 2D outputs the instruction signal Ci again to the connection devices 3 and 4. Since, at this time, the device side control unit 3F is executing the level process, the second connection device 4 receives the start command signal Ti and the instruction signal Ci.

Therefore, the authentication process is started on the second connection device 4. When the authentication process executed on the second connection device 4 is finished, the second connection device 4 transmits an ACK signal indicating completion of the authentication process to the apparatus side control unit 2D and executes the level process.

When the process (S3) for bringing the connection terminals 3G and 4G to Hi-z is finished, the apparatus side control unit 2D determines whether or not a state where the printing apparatus 2 is not operating (hereafter, referred to as a non-operation time) has continued for a predetermined time (S5). When the apparatus side control unit 2D determines that the non-operation time is smaller than the predetermined time (S5: NO), step S5 is executed again.

When the apparatus side control unit 2D determines that the non-operation time becomes larger than or equal to the predetermined time (S5: YES), the printing apparatus system 1 moves to a sleep state. The sleep state means that at least an actual supply voltage to the connection devices 3 and 4 is set to a voltage lower than a supply voltage to the connection devices 3 and 4 in a normal state.

When the printing apparatus system 1 moves to the sleep state, the apparatus side control unit 2D determines whether or not a release condition for releasing the sleep state is satisfied (S9). The word "satisfying the release condition" means, for example, a case where print data is received or a case where an operation panel (not shown) of the printing apparatus 2 is operated.

When the apparatus side control unit 2D determines that the release condition is not satisfied (S9: NO), step S9 is executed again in a state where the sleep state is maintained. When the apparatus side control unit 2D determines that the release condition is satisfied (S9: YES), step S1 is executed again after the sleep state is released.

Figure 4:
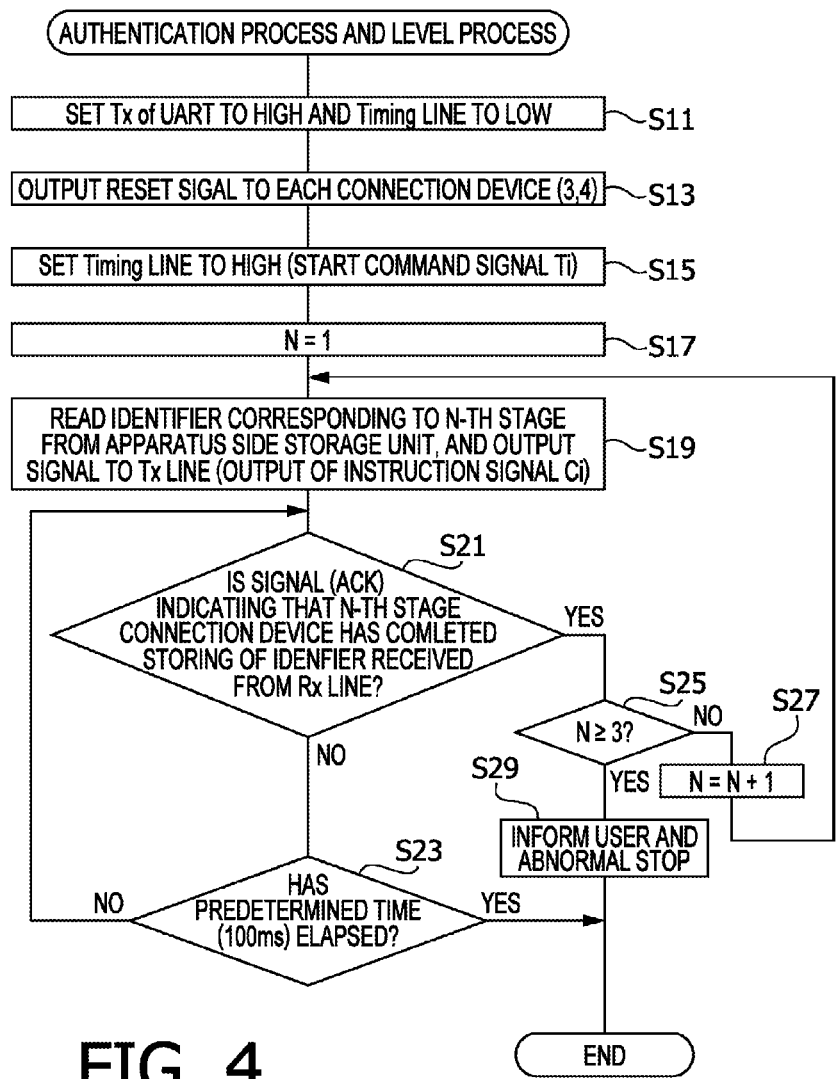
FIG. 4 is a flowchart illustrating an authentication process and a level process executed by a printing apparatus according to the first embodiment.

2.2 Operation of Printing Apparatus in Authentication Process and Level Process (FIG. 4)

An authentication process and a level process shown in FIG. 4 are executed under control of the apparatus side control unit 2D of the printing apparatus 2. A program for executing the authentication process and the level process shown in FIG. 4 has been stored in advance in a non-volatile memory (e.g., a ROM) provided in the printing apparatus 2 (the apparatus side control unit 2D).

When the authentication process and the level process are started, the output part (Tx) of UART is set to a High level and the ASIC terminal (Timing) is set to a Low level (S11). Then, a reset signal is output to the connection devices 3 and 4 (S13). The reset signal is a signal for instructing the device side control units 3F and 4F to delete the identification information (i.e., results obtained by the last execution of the authentication process) stored in the device side storage units 3C and 4C.

After the start command signal Ti is output by setting the ASIC terminal (Timing) to a High level (S15), 1 is assigned to a parameter N which indicates the number of connection devices (i.e., the number of stages) connected to the printing apparatus 2 (S17).

Then, the apparatus side control unit 2D reads the identification information (also referred to as an identifier) corresponding to the N-th stage from the apparatus side storage unit 2C and is output from the output part (Tx) of UART as the instruction signal Ci. (S19). Thereafter, the apparatus side control unit 2D determines whether or not a response signal (an ACK signal) indicating that the identification information corresponding to the N-th stage has been stored in the device side storage unit 3C or 4C of the connection device 3 or 4 corresponding to the N-th stage is received at the input part (Rx) of UART (S21).

When the apparatus side control unit 2D determines that the ACK signal is not received (S21: NO), the apparatus side control unit 2D determines whether or not a predetermined time (e.g., 100 ms) has elapsed from the time when the instruction was output (S23).

When the apparatus side control unit 2D determines that the predetermined time has not elapsed from the time of output of the instruction signal (S23: NO), step S21 is executed. When the apparatus side control unit 2D determines that the predetermined time has elapsed from the time when the instruction signal was output (S23: YES), the apparatus side control unit 2D determines that the connection device corresponding to the N-th stage is not connected and the authentication process and the level process are terminated.

When the apparatus side control unit 2D determines in step S21 that the ACK signal is received (S21: YES), the apparatus side control unit 2D determines whether or not the current parameter N is larger than or equal to a value (3 in FIG. 4) defined by adding 1 to the maximum number (e.g., 2) of connection devices connectable to the printing apparatus 2 (S25).

When the apparatus side control unit 2D determines that the current parameter N is not larger than or equal to 3 (S25: NO), the parameter N is updated by adding 1 to the current parameter N (S27), and step S19 is executed.

When the apparatus side control unit 2D determines that the current parameter N is larger than or equal to 3 (S25: YES), information indicating this fact is informed to the user, for example, as an image (which may include text) or sound (S29). Then, the authentication process and the level process are terminated.

2.3 Operation of Connection Device in Authentication Process and Level Process

Figure 5:
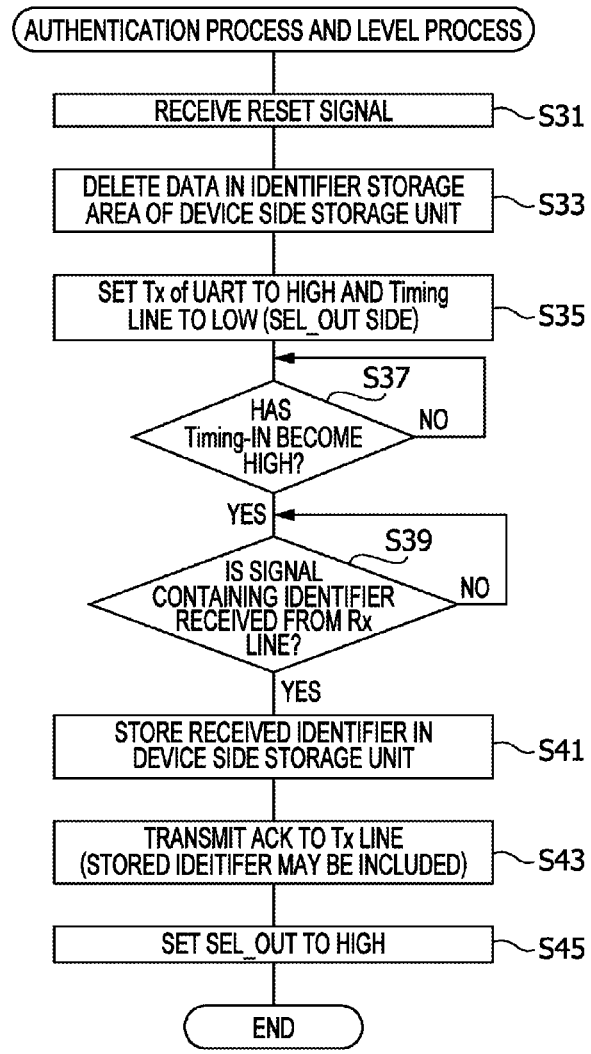
FIG. 5 is a flowchart illustrating an authentication process and a level process executed by a connection device according to the first embodiment.

An authentication process and a level process shown in FIG. 5 are executed under control of the device side control unit 3F (4F) of the connection device 3 (4). A program to execute the authentication process and the level process shown in FIG. 5 has been stored in a non-volatile memory (e.g., a ROM) provided in the connection device 3 (4) (the device side control unit 3F (4F)).

When the authentication process and the level process are started and the reset signal is received (S31), the identification information (the identifier) stored in an identifier storage area of the device side storage unit 3C (4C) is deleted (S33). Then, the input part (Rx) of UART of the device side communication unit 3D (4D) is set to a High level, and the connection terminal (SEL_OUT) 3G (4G) is set to a Low level (S35).

Next, the device side control unit 3F (4F) determines whether or not the Timing-IN of the device side communication unit 3D (4D) has become a High level (S37). When the device side control unit 3F (4F) determines that Timing-IN has not become a High level (S37: NO), step S37 is executed again.

When the device side control unit 3F (4F) determines that Timing-IN has becomes a High level (S37: YES), the device side control unit 3F (4F) determines whether or not a signal (the instruction signal Ci) including the identifier is received at the input part (Rx) of UART of the device side communication unit 3D (4D).

When the device side control unit 3F (4F) determines that the signal (the instruction signal Ci) including the identifier is not received (S39: NO), step S39 is executed again. When the device side control unit 3F (4F) determines that the signal (the instruction signal Ci) including the identifier is received (S39: YES), the device side control unit 3F (4F) stores the received identifier in the device side storage unit 3C (4C) (S41).

Then, a response signal (ACK signal) indicating that "the received identifier is stored in the device side storage unit 3C (4C)" is output from the output part (Tx) of the device side communication unit 3D (4D) (S43). The process from S31 to S43 corresponds to the authentication process. Thereafter, the device side control unit 3F (4F) executes the level process where the connection terminal 3G (4G) (SEL_OUT) is set to Hi-z or a High level (S45).

Figure 6:
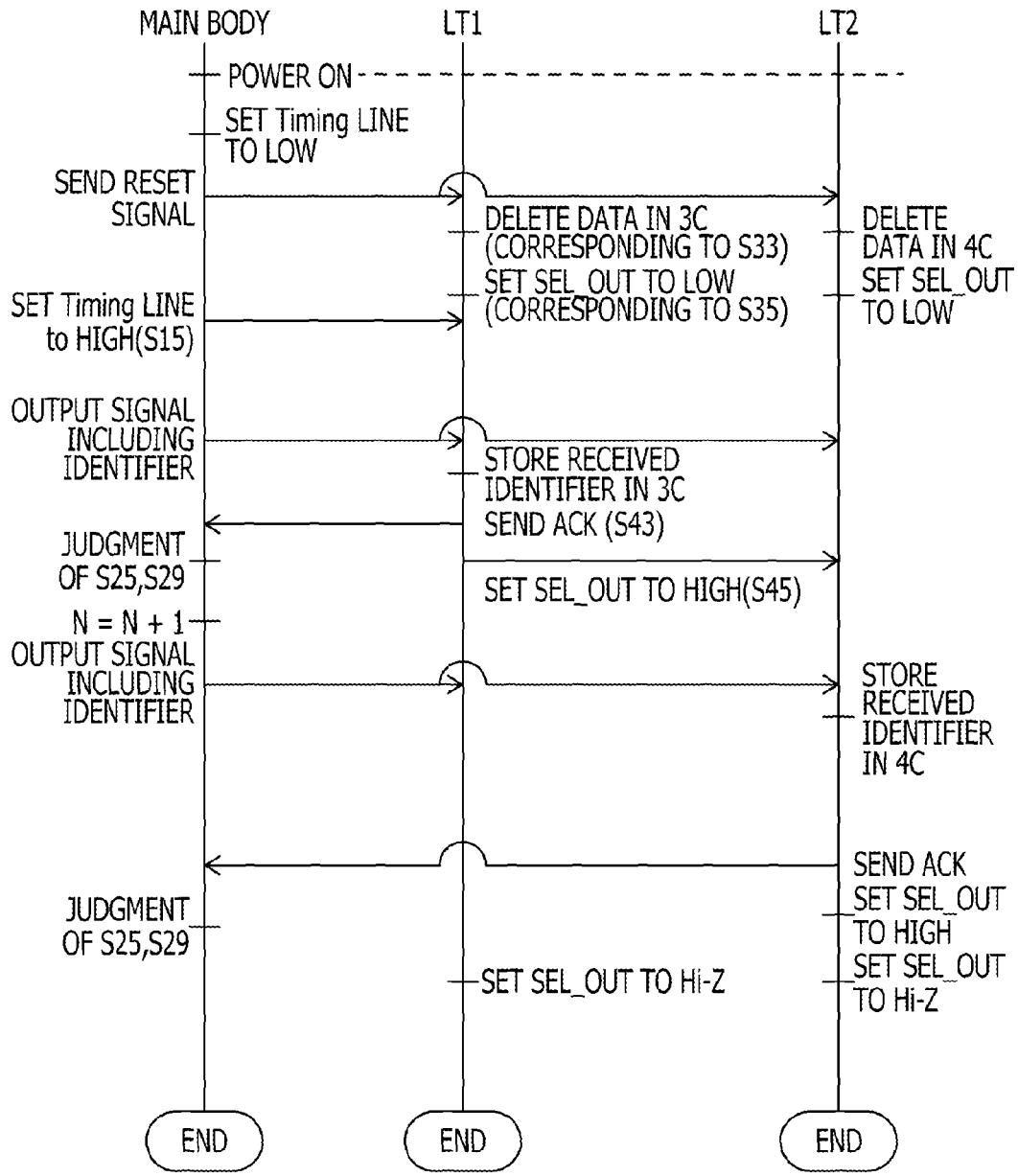
FIG. 6 is a sequence diagram illustrating operation timing between the printing apparatus and the connection device according to the first embodiment.

In the sequence diagram shown in FIG. 6, the operations between the printing apparatus 2 and the connection devices 3 and 4 (LT1 and LT2) as explained above with reference to FIGS. 4 and 5 are illustrated.

3. Advantageous Effects of Printing Apparatus System according to the Embodiment According to the embodiment, it is possible to sequentially authenticate a plurality of connection devices connected to the printing apparatus 2 in series and in multistage, by using a simple configuration formed of electric resistances 3E and 4E. As a result, reliability and durability of the printing apparatus system 1 can be enhanced.

In this embodiment, the maximum number of connection devices connectable to the printing apparatus 2 is stored in the printing apparatus 2. When the apparatus side control unit 2D recognizes the number of connection devices exceeding the maximum number, the apparatus side control unit 2D informs the user that the number of connection devices exceeding the maximum number is detected. As a result, it becomes possible to prevent occurrence of malfunction due to excessive connection of connection devices.

In this embodiment, when the authentication process is finished, the device side control unit 3F (4F) controls the device side communication unit 3D (4D) to transmit the response signal to the apparatus side control unit 2D. As a result, by checking the response signal by the apparatus side control unit 2D, it becomes possible to enhance the reliability of the authentication process.

In this embodiment, each of the device side storage units 3C and 4C is a volatile memory. When a voltage supply state to the plurality of connection devices moves from a low voltage state to a normal voltage state, the apparatus side control unit 2D operates to transmit the start command signal Ti to a next stage connection device, and to transmit the instruction signal Ci to the plurality of connection devices. As a result, since the authentication process is executed each time the state where the voltage supply state to the connection devices 3 and 4 is moved from the low voltage state to the normal voltage state, there is no necessity to use a non-volatile memory as the device side storage unit 3C (4C).

In the level process according to the embodiment, the device side control unit 3F (4F) sets the connection terminal 3G (4G), which connects the device side control unit 3F (4F) with a side of the electric resistance close to the device output connection unit, to Hi-z. As a result, it becomes possible to transmit/receive a signal by using the line on which the electric resistances 3E and 4E are provided.

Second Embodiment

1. Control of Printing Apparatus System

Main Control according to the second embodiment is the same as that of the first embodiment, and only the authentication process and the level process are different from the first embodiment. Therefore, explanation about the second embodiment focuses on the authentication process and the level process, and explanation about the main control is omitted.

Figure 8:
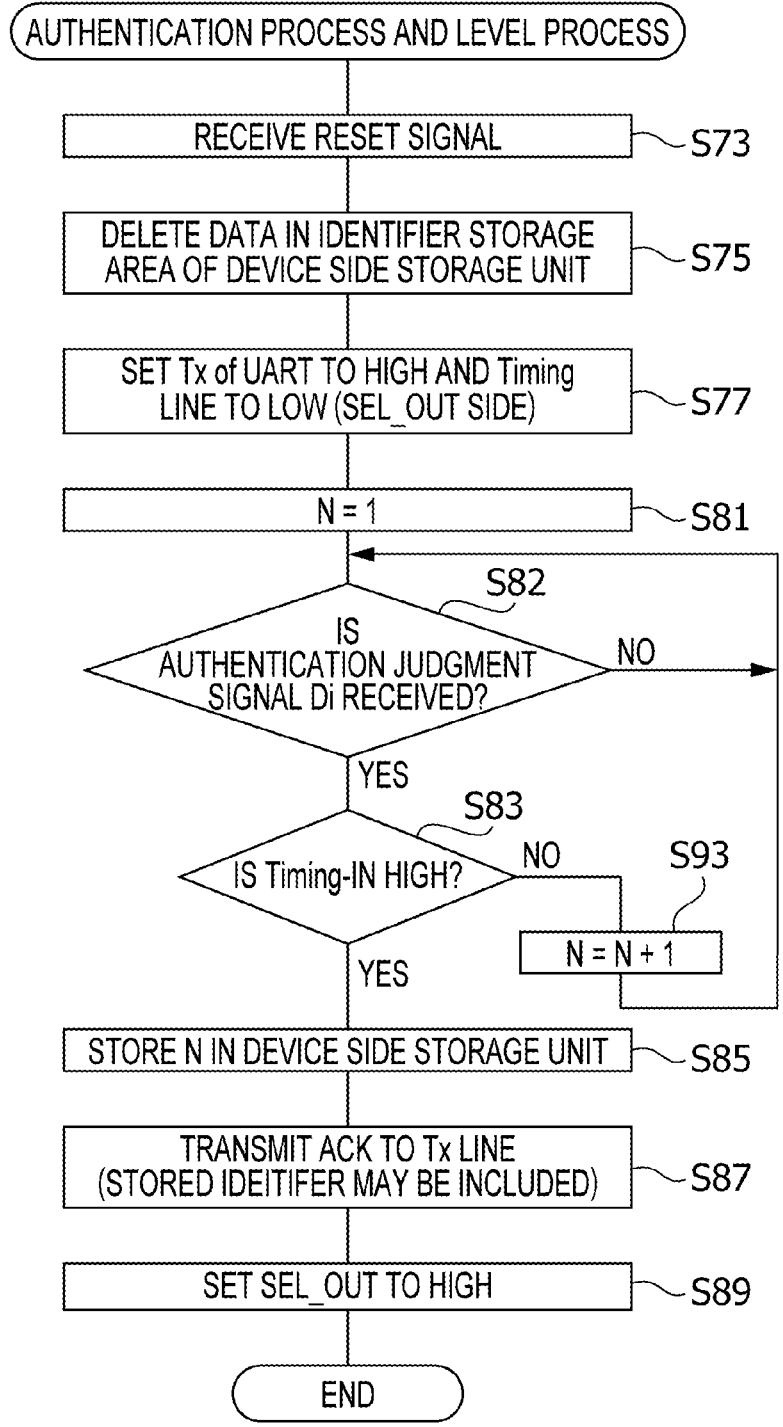
FIG. 8 is a flowchart illustrating an authentication process and a level process executed by a connection device according to the second embodiment.
Figure 9:
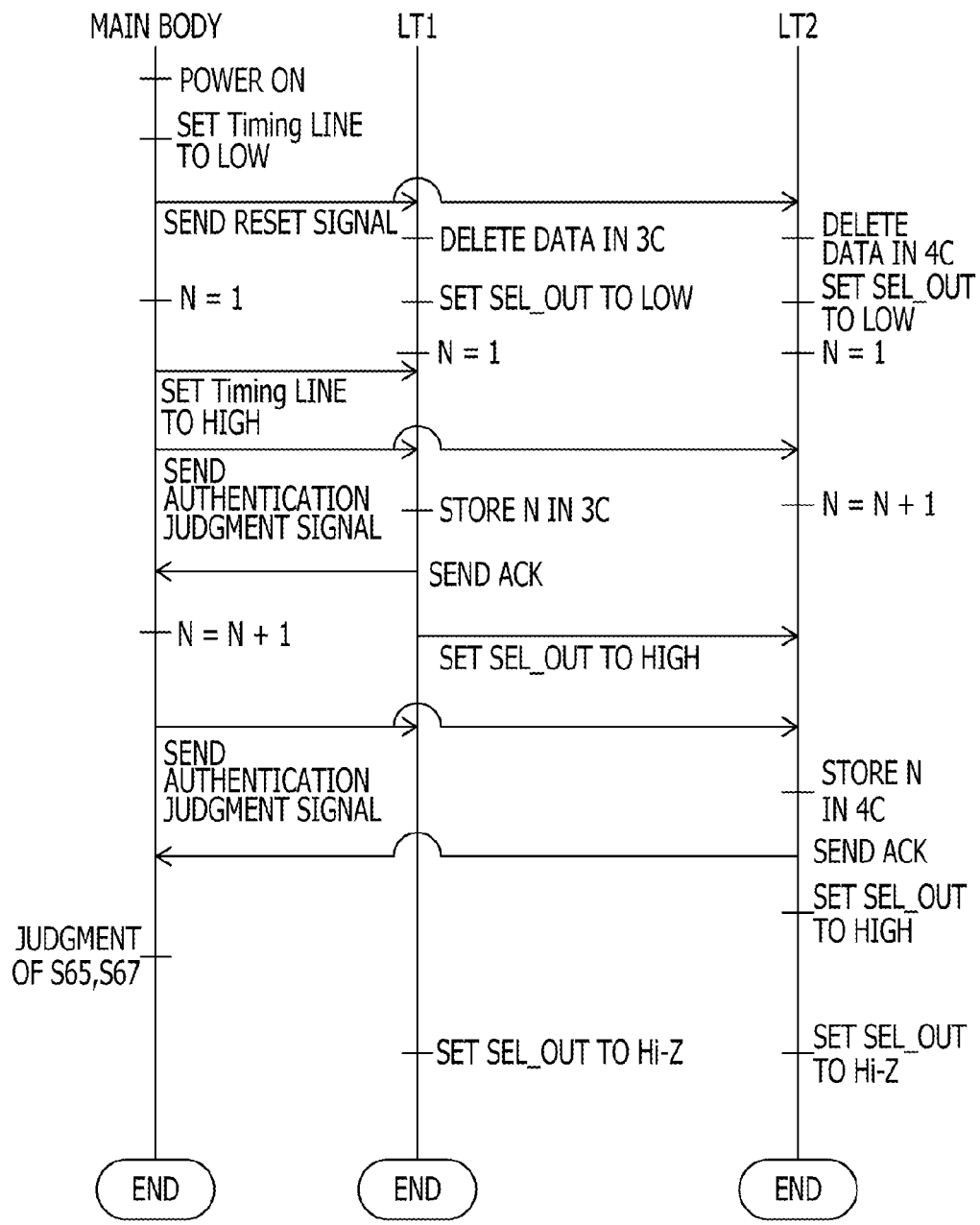
FIG. 9 is a sequence diagram illustrating operation timing between the printing apparatus and the connection device according to the second embodiment.

The difference between the authentication process and the level process according to the second embodiment and the authentication process and the level process according to the first embodiment is as follows. That is, as shown in FIGS. 4 to 6, in the first embodiment, the authentication process and the level process are executed by the connection device 3 (4) which has received the start command signal Ti and the instruction signal Ci including the identifier, in cooperation with the apparatus side control unit 2D. By contrast, according to the second embodiment, as shown in FIGS. 7 to 9, the connection device 3 (4) which has received an authentication judgment signal Di and the start command signal Ti executes an authentication process and a level process in cooperation with the apparatus side control unit 2D.

The authentication judgment signal Di means a signal having a predetermined signal pattern, and is not a signal including an identifier like the instruction signal Ci. The device side control unit 3F determines that the authentication judgment signal Di is received when the device side control unit 3F receives a signal having a pattern corresponding to the predetermined signal pattern

Figure 7:
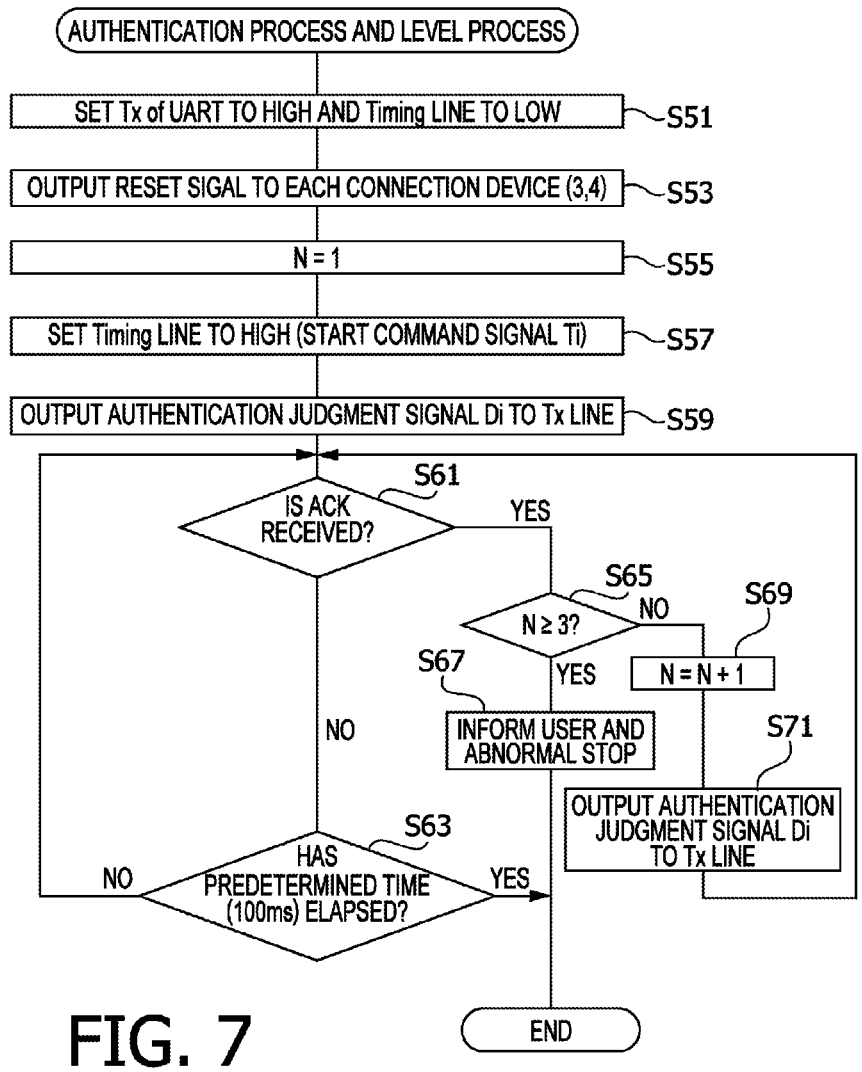
FIG. 7 is a flowchart illustrating an authentication process and a level process executed by a printing apparatus according to a second embodiment.

1.1 Operation of Printing Apparatus in Authentication Process and Level Process An authentication process and a level process shown in FIG. 7 are executed under control of the apparatus side control unit 2D of the printing apparatus 2. A program to execute the authentication process and the level process shown in FIG. 7 has been stored in a non-volatile memory (e.g., a ROM) provided in the printing apparatus 2 (the apparatus side control unit 2D).

When the authentication process and the level process are started by the apparatus side control unit 2D, the output part (Tx) of UART is set to a High level and the ASIC terminal (Timing) is set to a Low level (S51). Then, a reset signal is transmitted to the connection devices 3 and 4 (S53).

Next, 1 is assigned to the parameter N (S55), and the start command signal Ti is output by setting the ASIC terminal (Timing) to a High level (S57). Thereafter, the authentication judgment signal Di is transmitted from the output part (Tx) of UART (S59).

When the authentication judgment signal Di and the start command signal Ti are output, the apparatus side control unit 2D determines whether or not a response signal (an ACK signal) indicating that the identifier has been stored in the device side storage unit 3C (4C) of the connection device 3 (4) is received (S61).

When the apparatus side control unit 2D determines that the ACK signal is not received (S61: NO), the apparatus side control unit 2D determines whether or not a predetermined time (e.g., 100 ms) has elapsed from the time when the authentication judgment signal Di is output (S63).

When the apparatus side control unit 2D determines that the predetermined time has not elapsed from the time when the authentication judgment signal Di is output (S63: NO), step S61 is executed. When the apparatus side control unit 2D determines that the predetermined time has elapsed form the time when the authentication judgment signal Di is output (S63: YES), the authentication process and the level process are terminated.

When the apparatus side control unit 2D determines that the ACK signal is received (S61: YES), the apparatus side control unit 2D determines whether or not the current parameter N is larger than or equal to a value (3 in FIG. 7) defined by adding 1 to the maximum number (e.g., 2) of connection devices connectable to the printing apparatus 2 (S65).

When the apparatus side control unit 2D determines that the current parameter N is not larger than or equal to 3 (S65: NO), the parameter N is updated by adding 1 to the current parameter N (S67), and then the authentication judgment signal Di is output from the output part (Tx) of UART (S71). Then, step S61 is executed.

When the apparatus side control unit 2D determines that the current parameter N is larger than or equal to 3 (S65: YES), information indicating this fact is informed to the user, for example, as an image (which may include text) or sound (S67). Then, the authentication process and the level process are terminated.

1.2 Operation of Connection Device in Authentication Process and Level Process An authentication process and a level process shown in FIG. 8 are executed under control of the device side control unit 3F (4F) of the connection device 3 (4). A program to execute the authentication process and the level process shown in FIG. 8 has been stored in a non-volatile memory (e.g., a ROM) provided in the connection device 3 (4) (the apparatus side control unit 3F (4F)).

When the authentication process and the level process are started and the reset signal is received (S73), the identification information (the identifier) stored in the identifier storage area of the device side storage unit 3C (4C) is deleted (S75). Then, the input part (Rx) of UART of the device side communication unit 3D (4D) is set to a High level, and the connection terminal (SEL_OUT) 3G (4G) is set to a Low level (S77).

Then, 1 is assigned to the parameter N set in the connection device 3 (4) (S81). Then, the device side control unit 3F determines whether or not the authentication judgment signal Di has been received (S82). When the device side control unit 3F determines that the authentication judgment signal Di has not been received (S82: NO), step S82 is executed again.

When the device side control unit 3F determines that the authentication judgment signal has been received (S82: YES), the device side control unit 3F determines whether or not the Timing-IN of the device side communication unit 3D is a High level (S83).

When the device side control unit 3F determines that the Timing-IN is a High level (S83: YES), content of the parameter N is stored in the device side storage unit 3C (4C) as an identifier (S85).

Then, the response signal (ACK signal) is output from the output part (Tx) of UART of the device side communication unit 3D (4D) (S87). Next, the level process where the connection terminal 3G (4G) (SEL_OUT) is set to a High Level or Hi-z (S89) is executed. Then, the authentication process and the level process are terminated.

When the device side control unit 3F (4F) determines that the Timing-IN is not a High level (S83: NO), the parameter N is updated by adding 1 to the current parameter N (S93). Then, step S82 is executed again.

In the sequence diagram shown in FIG. 9, the operations between the printing apparatus 2 and the connection devices 3 and 4 (LT1 and LT2) as explained above with reference to FIGS. 7 and 8 are illustrated.

In this embodiment, the apparatus side control unit 2D controls the apparatus side communication unit 2B so as to transmit the authentication judgment signals a plurality of times to each of the plurality of connection devices 3 and 4. In the authentication process, the device side control unit 3F (4F) controls the device side storage unit 3C (4C) so as to store the number of times that the authentication judgment signal Di transmitted from the apparatus side communication unit 2B is received.

Therefore, according to the second embodiment, there is no necessity for the connection devices 3 and 4 to store the identification information. Accordingly, it is not necessary to provide the connection devices 3 and 4 with a non-volatile memory.

Third Embodiment

1. Control of Printing Apparatus System

Main Control according to the third embodiment is the same as that of the first embodiment, and only the authentication process and the level process are different from the first embodiment. Therefore, explanation about the third embodiment focuses on the authentication process and the level process, and explanation about the main control is omitted.

Figure 11:
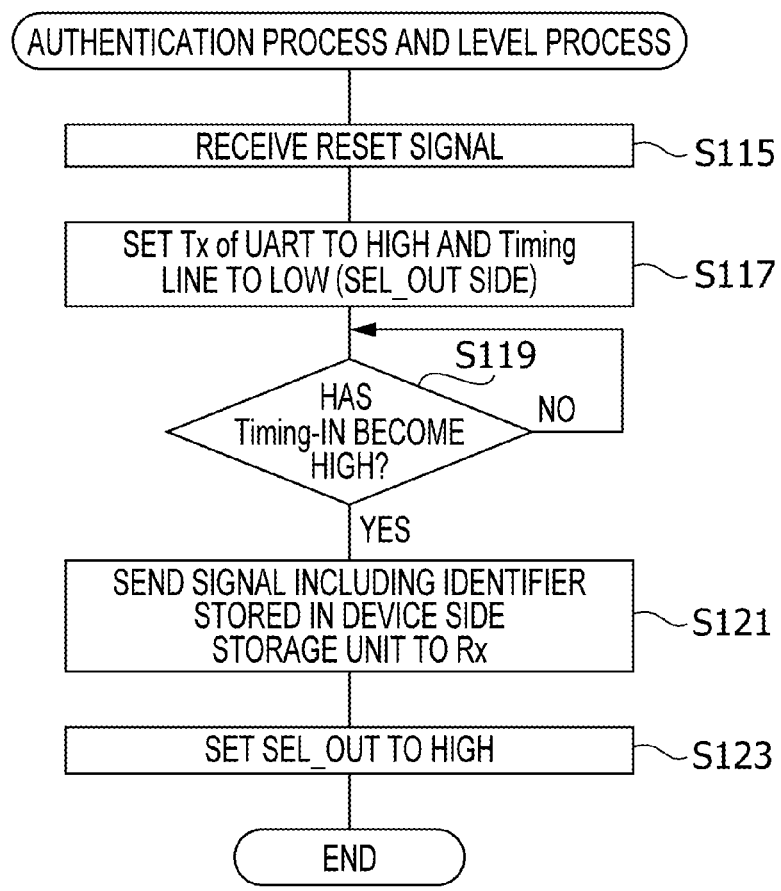
FIG. 11 is a flowchart illustrating an authentication process and a level process executed by a connection device according to the third embodiment.
Figure 12:
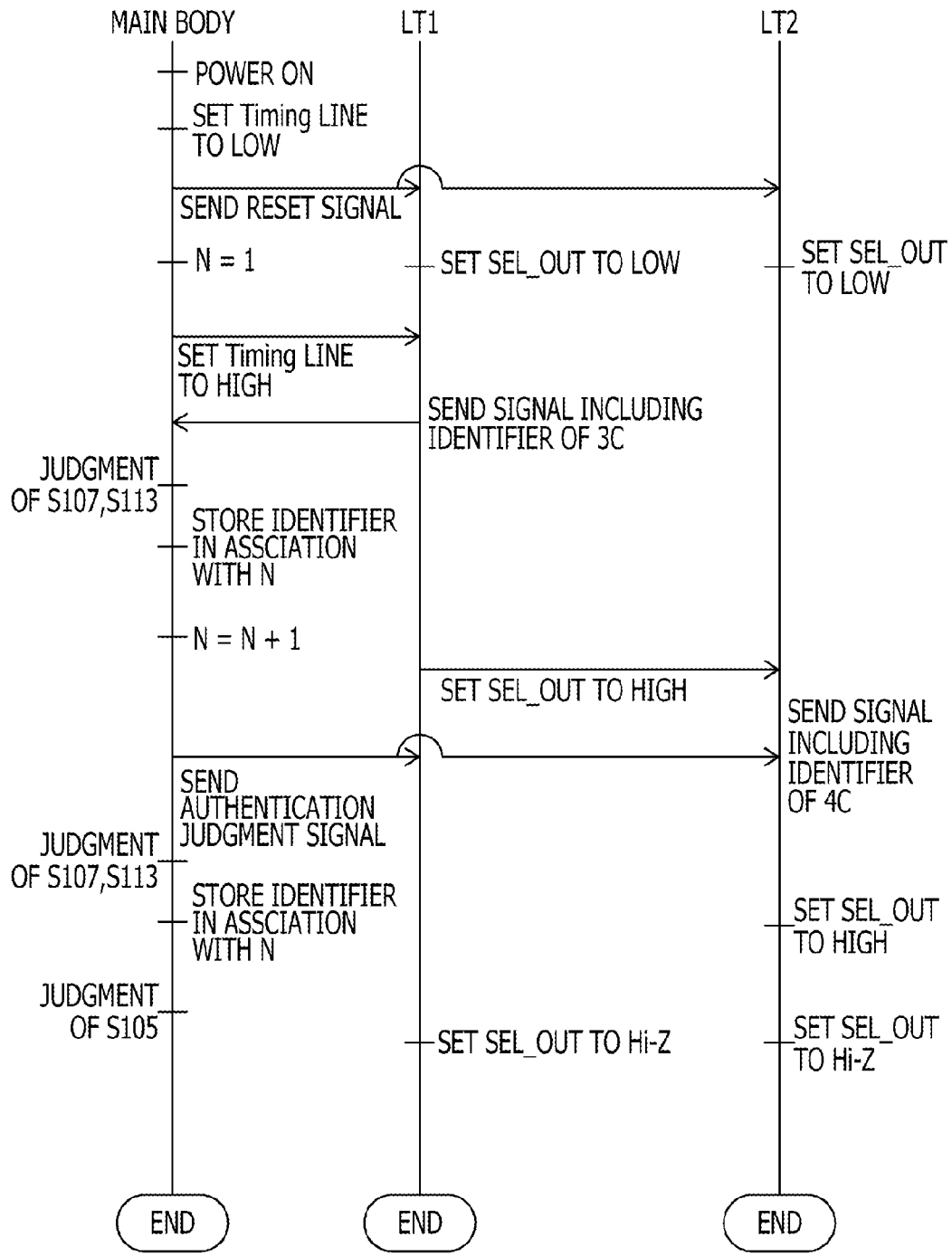
FIG. 12 is a sequence diagram illustrating operation timing between the printing apparatus and the connection device according to the third embodiment.

The difference between the authentication process and the level process according to the third embodiment and the authentication process and the level process according to the first embodiment is as follows. That is, as shown in FIGS. 4 to 6, in the first embodiment, the connection devices 3 and 4 transmits the response signal (ACK signal) indicating that the identifier is stored. By contrast, according to the third embodiment, as shown in FIGS. 10 to 12, the connection devices 3 and 4 transmit information including an identifier to the printing apparatus 2, and the printing apparatus 2 which has received the information stores the received information in the apparatus side storage unit 2C while associating a parameter N with the received information.

1.1 Operation of Printing Apparatus in Authentication Process and Level Process

Figure 10:
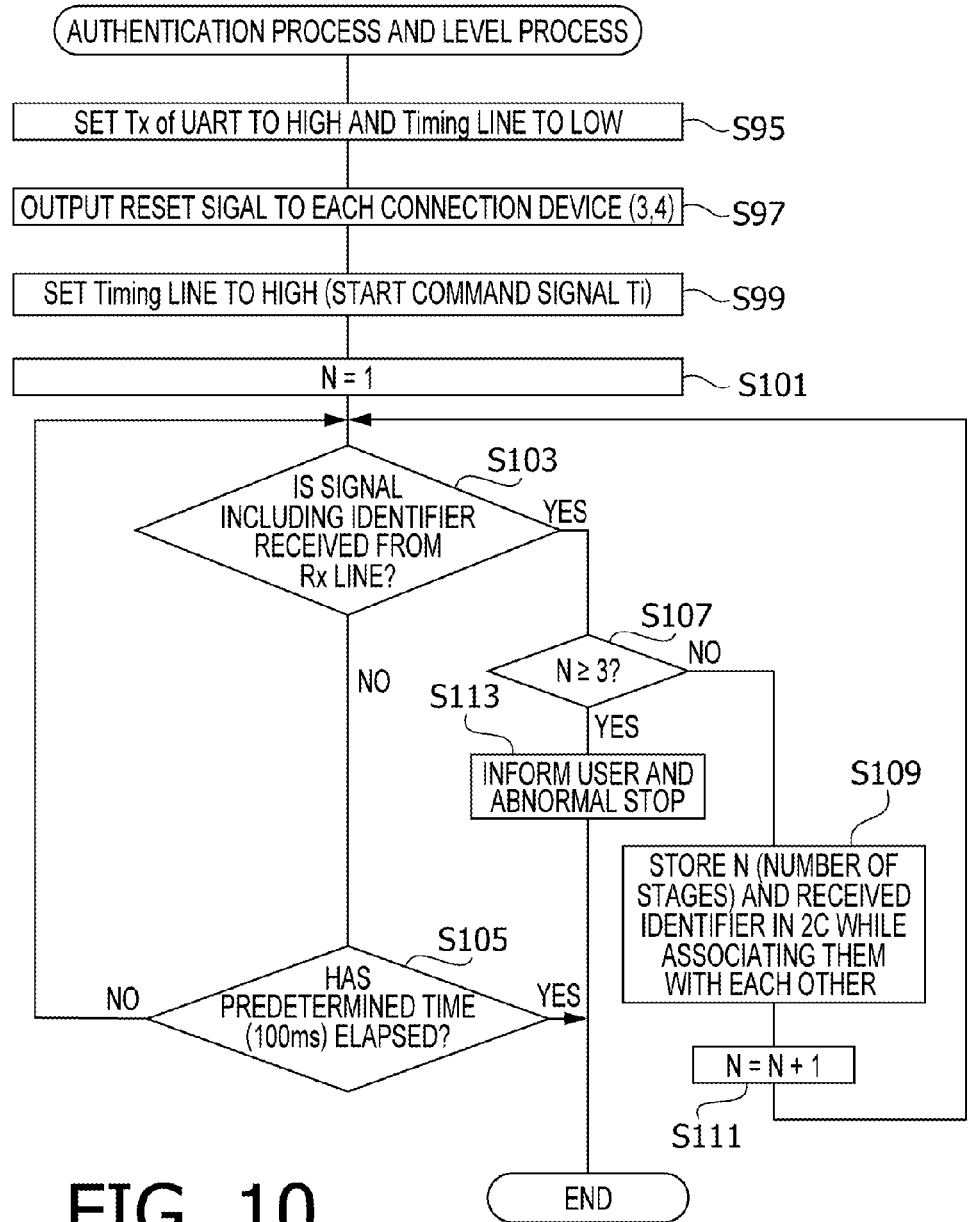
FIG. 10 is a flowchart illustrating an authentication process and a level process executed by a printing apparatus according to a third embodiment.

An authentication process and a level process shown in FIG. 10 are executed under control of the apparatus side control unit 2D of the printing apparatus 2. A program to execute the authentication process and the level process shown in FIG. 10 has been stored in a non-volatile memory (e.g., a ROM) provided in the printing apparatus 2 (the apparatus side control unit 2D).

When the authentication process and the level process are started by the apparatus side control unit 2D, the output part (Tx) of UART is set to a High level and the ASIC terminal (Timing) is set to a Low level (S95). Then, a reset signal is transmitted to the connection devices 3 and 4 (S97).

After the start command signal Ti is output by setting the ASIC terminal (Timing) to a High level (S99), 1 is assigned to the parameter N indicating the number of connection devices (3 and 4) (i.e., the number-of-stage) connectable to the printing apparatus 2 (S101).

Next, the apparatus side control unit 2D determines whether or not the identification information corresponding to N-th stage has been received at the input part (Rx) of UART, i.e., whether or not information including an identifier transmitted from the connection device 3 or 4 is received (S103).

When the apparatus side control unit 2D determines that the information including an identifier is not received (S103: NO), the apparatus side control unit 2D determines whether or not a predetermined time (e.g., 100 ns) has elapsed from the time when the authentication process and the level process are started (S105).

When the apparatus side control unit 2D determines that the predetermined time has not elapsed (S105: NO), step S103 is executed. When the apparatus side control unit 2D determines that the predetermined time has elapsed (S105: YES), the authentication process and the level process are terminated.

When the apparatus side control unit 2D determines in step S103 that the information including an identifier is received (S103: YES), the apparatus side control unit 2D determines whether or not the current parameter N is larger than or equal to a value (3 in FIG. 10) defined by adding 1 to the maximum number (e.g., 2) of connection devices connectable to the printing apparatus 2 (S107).

When the apparatus side control unit 2D determines that the current parameter N is not larger than or equal to 3 (S107: NO), the apparatus side control unit 2D regards the parameter N as the number of stages and stores the parameter N and the identifier in the apparatus side storage unit 2C while associating the parameter N with the identifier (S109). Next, the parameter N is updated by adding 1 to the current parameter N (S111). Then, the process returns to step S103.

When the apparatus side control unit 2D determines that the current parameter N is larger than or equal to 3 (S107: YES), information indicating this fact is informed to the user, for example, as an image (which may include text) or sound (S113). Then, the authentication process and the level process are terminated.

1.2 Operation of Connection Device in Authentication Process and Level Process

An authentication process and a level process shown in FIG. 11 are executed under control of the device side control unit 3F (4F) of the connection device 3 (4). A program to execute the authentication process and the level process shown in FIG. 11 has been stored in a non-volatile memory (e.g., a ROM) provided in the connection device 3 (4) (the apparatus side control unit 3F (4F)).

When the authentication process and the level process are started and the reset signal is received (S115), the input part (Rx) of UART of the device side communication unit 3D (4D) is set to a High level, and the connection terminal (SEL_OUT) 3G (4G) is set to a Low level (S117).

Next, the device side control unit 3F (4F) determines whether or not the Timing-IN of the device side communication unit 3D (4D) has become a High level (S119). When the device side control unit 3F (4F) determines that Timing-IN has not become a High level (S119: NO), step S119 is executed again.

When the device side control unit 3F (4F) determines that the Timing-IN of the device side communication unit 3D (4D) has become a High level (S119: YES), the device side control unit 3F (4F) transmits the signal including the identifier stored in advance in the device side storage unit 3C (4C) to the input part (Rx) of UART of the printing apparatus 2 from the output part (Tx) of UART of the device side communication unit 3D (4D).

Thereafter, the device side control unit 3F (4F) executes the level process where the connection terminal 3G (4G)

(SEL_OUT) is set to a Hi-z or a High level (S123). Then, the authentication process and the level process are terminated.

In the sequence diagram shown in FIG. 12, the operations between the printing apparatus 2 and the connection devices 3 and 4 (LT1 and LT2) as explained above with reference to FIGS. 10 and 11 are illustrated.

In the authentication process according to the third embodiment, the device side control unit 3F (4F) controls the device side communication unit 3D (4D) to transmit the response signal including the identification information (the identifier) stored in the device side storage unit 3C to the apparatus side communication unit 2B.

As a result, according to the third embodiment, it becomes possible to execute the authentication process in which the number of stage is associated with the identification information (identifier) included in the response signal.

Other Embodiments

In the above described embodiments, the level process is executed such that the connection terminals 3G (4G) is set to Hi-z or a High level. This intends to bring the line connected to the connection terminal 3G (4G) to Hi-z or a High level.

Therefore, in another embodiment, a portion on the line connected to the connection terminal 3G (4G) may be set to Hi-z or a High level, in place of setting the connection terminal 3G (4G) to Hi-z or a High level.

In the above described embodiments, the printing apparatus system is configured such that two connection devices are connected to the printing apparatus; however, in another embodiment the printing apparatus system may be configured such that a single connection device is connected to the printing apparatus or three or more connection devices are connected to the printing apparatus.

In the above described embodiments, the paper supply tray is explained as the connection device by way of example; however, in another embodiment, another type of optional device may be used as a connection device.

In the above described embodiments, a volatile memory is used as the device side storage unit 3C (4C); however, in another embodiment, a non-volatile memory may be used as the device side storage unit 3C (4C).

By using a non-volatile memory as the device side storage unit 3C (4C), it becomes possible to omit the authentication process to be executed each time the low voltage state where the voltage supplied to the connection devices 3 and 4 is low moves to a normal state.

In the above described embodiments, (a) when the start command signal Ti or the signal corresponding to the start command signal Ti which is input to the electric resistance 3E (4E) is input to the device side control unit 3F (4F), the authentication process is executed, and (b) when the authentication process is finished, the level process is executed. It should be understood that, in another embodiment, processes equivalent to the above processes (a) and (b) may be executed.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

What is claimed is:

1. A printing apparatus system, comprising:
a printing apparatus; and
a plurality of connection devices connected to the printing apparatus in multistage,
the printing apparatus comprising:
an apparatus side connector configured to be connected to one of the plurality of connection devices;
an apparatus side storage unit; and
an apparatus side controller,
an apparatus side communication circuit configured to communicate with the plurality of connection devices, the apparatus side communication circuit electrically connecting the apparatus side connector to the apparatus side controller;
each of the plurality of the connection devices comprising:
a device side output connector configured to be connected to one of others of the plurality of connection devices;
a device side input connector configured to be connected to one of the apparatus side connector and the device side output connector of one of the others of the plurality of connection devices;
a signal line connecting the device side output connector to the device side input connector;
an electric resistance disposed on the signal line;
a device side controller connected to the signal line between the electric resistance and the device side input connection, the device side input connector and the device side output connector being connected with each other through the electric resistance a voltage level of a start command signal output from the printing apparatus being equal to or higher than a predetermined level, and the voltage level of the start command signal being reduced to be less than the predetermined level as it has passed through the electric resistance;
a device side storage unit; and
a device side communication circuit configured to communicate with the printing apparatus, the device side communication circuit electrically connecting the device side input connector to the device side controller;
wherein the device side controller is configured to:
execute an authentication process in cooperation with the apparatus side controller when a signal is input to the device side controller, the signal corresponding to a start command signal which is output from the printing apparatus and is input to the electric resistance, wherein the device side controller executes the authentication process when it receives the start command signal of which voltage level is equal to or higher than the predetermined level, while the device side controller does not execute the authentication process when it receives the start command signal of which voltage level is lower than the predetermined level; and
execute a level process in which a voltage level of the start command signal which has passed the electric resistance is set to be higher than or equal to the predetermined level when the authentication process is finished,
wherein the apparatus side controller is configured to store, in the apparatus side storage unit based on the authentication process and the level process, identification information assigned to each of the plurality of connection devices and number-of-stage information indicating, for each of the plurality of connection devices, which stage a connection device associated with the identification information is connected to, wherein the identification information is associated with the number-of-stage information.

2. The printing apparatus system according to claim 1, wherein the device side controller is configured to execute the authentication process in cooperation with the apparatus side controller when the signal corresponding to the start command signal is input to the device side controller and an instruction signal output from the printing apparatus is input to the device side controller.

3. The printing apparatus system according to claim 2, wherein:
the instruction signal includes a signal indicating the identification information stored in the apparatus side storage unit;
the apparatus side controller is configured to:
control, in the authentication process, the apparatus side communication circuit to transmit signals including the identification information associated with the number-of-stages in order of number-of-stage, to the plurality of connection devices, respectively,
the device side controller is configured to:
control, in the authentication process, the device side storage unit to store the identification information in the device side storage unit, based on the identification information included in the signal transmitted to the plurality of connection devices by the apparatus side communication circuit.

4. The printing apparatus system according to claim 3, wherein:
the device side controller is configured to:
control, in the authentication process, the device side storage unit to store the identification information in the device side storage unit, based on the identification information included in the signal transmitted to the plurality of connection devices by the apparatus side communication circuit; and
control, in the authentication process, the device side communication circuit to transmit a response signal corresponding to the identification information stored in the device side storage unit to the apparatus side controller.

5. The printing apparatus system according to claim 3, wherein:
the device side storage unit is a volatile memory; and
the apparatus side controller is configured to control the apparatus side communication circuit to transmit the start command signal to a next stage connection device of the plurality of connection devices, each time a power supply state for the plurality of connection devices moves from a low power supply state to a normal power supply state, and to transmit the instruction signal to the plurality of connection devices.

6. The printing apparatus system according to claim 2, wherein:
the apparatus side controller is configured to control the apparatus side communication circuit to transmit the instruction signal to each of the plurality of connection devices a plurality of times;
the device side controller is configured to:
control, in the authentication process, the device side storage unit to store a number of times that the instruction signal is transmitted by the apparatus side communication circuit.

7. The printing apparatus system according to claim 6, wherein:
the device side controller is configured to:
control, in the authentication process, the device side storage unit to store a number of times that the instruction signal is transmitted by the apparatus side communication circuit; and
control, in the authentication process, the device side communication circuit to transmit a response signal corresponding to the identification information stored in the device side storage unit to the apparatus side communication circuit.

8. The printing apparatus system according to claim 1, wherein the device side controller is configured to control, in the authentication process, the device side communication circuit to transmit a response signal including the identification information stored in the device side storage unit to the apparatus side communication circuit.

9. The printing apparatus system according to claim 1, wherein the device side controller is configured to set, in the level process, a connection terminal connecting the device side controller with the electric resistance from a side close to the device side output connector to a high impedance.

10. The printing apparatus system according to claim 1, wherein the device side controller is configured to generate, in the level process, the voltage level higher than or equal to the predetermined level on a side of the electric resistance close to the device side output connector.

11. The printing apparatus system according to claim 1, wherein:
the printing apparatus stores a maximum number of the plurality of connection devices connectable to the printing apparatus; and
the apparatus side controller is configured, when the plurality of connection devices exceeding the maximum number are detected, to inform a user of a fact that the plurality of connection devices exceeding the maximum number are detected.

12. A connection device used in a printing apparatus system in which a plurality of connection devices are connectable to a printing apparatus in multistage, the connection device comprising:
a device side output connector configured to be connected to one of others of the plurality of connection devices;
a device side input connector configured to be connected to one of the printing apparatus and the device side output connector of one of the others of the plurality of connection devices;
a signal line connecting the device side output connector to the device side input connector;
an electric resistance disposed on the signal line;
a device side controller connected to the signal line between the electric resistance and the device side input connector, the device side input connector and the device side output connector being connected with each other through the electric resistance, a voltage level of a start command signal output from the printing apparatus being equal to or higher than a predetermined level, and the voltage level of the start command signal being reduced to be less than the predetermined level as it has passed through the electric resistance;
a device side storage unit; and
a device side communication circuit configured to communicate with the printing apparatus, the device side communication circuit electrically connecting the device side input connector to the device side controller;

wherein the device side controller is configured to:

execute an authentication process in cooperation with the printing apparatus when a signal is input to the device side controller, the signal corresponding to a start command signal which is output from the printing apparatus and is input to the electric resistance, wherein the device side controller executes the authentication process when it receives the start command signal of which voltage level is equal to or higher than the predetermined level, while the device side controller does not execute the authentication process when it receives the start command signal of which voltage level is lower than the predetermined level; and execute a level process in which a voltage level of the start command signal which has passed the electric resistance is set to be higher than or equal to the predetermined level when the authentication process is finished.

13. A method for controlling a printing apparatus system in which a printing apparatus and a plurality of connection devices connected to the printing apparatus in multistage are provided, the printing apparatus comprising: an apparatus side connector configured to be connected to one of the plurality of connection devices; an apparatus side storage unit; and an apparatus side controller, an apparatus side communication circuit configured to communicate with the plurality of connection devices, the apparatus side communication circuit electrically connecting the apparatus side connector to the apparatus side controller;

each of the plurality of the connection devices comprising: a device side output connector configured to be connected to one of others of the plurality of connection devices; a device side input connector configured to be connected to one of the apparatus side connector and the device side output connector of one of the others of the plurality of connection devices; a signal line connecting the device side output connector to the device side input connector; an electric resistance disposed on the signal line; a device side controller connected to the signal line between the electrical resistance and the device side input connection, the device side input connector and the device side output connector being connected with each other through the electric resistance; a voltage level of a start command signal output from the printing apparatus being equal to or higher than a predetermined level, and the voltage level of the start command signal being reduced to be less than the predetermined level as it has passed through the electric resistance; a device side storage unit; and a device side communication circuit configured to communicate with the printing apparatus, the device side communication circuit electrically connecting the device side input connector to the device side controller;

the method comprising:

causing the device side controller to execute an authentication process in cooperation with the apparatus side controller when a signal is input to the device side controller, the signal corresponding to a start command signal which is output from the printing apparatus and is input to the electric resistance, wherein the device side controller executes the authentication process when it receives the start command signal of which voltage level is equal to or higher than the predetermined level, while the device side controller does not execute the authentication process when it receives the start command signal of which voltage level is lower than the predetermined level; and causing the device side controller to execute a level process in which a voltage level of the start command signal which has passed the electric resistance is set to be higher than or equal to the predetermined level when the authentication process is finished, wherein, in the apparatus side storage unit, identification information assigned to each of the plurality of connection devices and number-of-stage information indicating, for each of the plurality of connection devices, which stage a connection device associated with the identification information is connected to is stored based on the authentication process and the level process, and wherein the identification information is associated with the number-of-stage information.

14. A non-transitory computer readable medium storing instructions to be executed by a processor of a connection device used in a printing apparatus system in which a plurality of connection devices are connectable to a printing apparatus in multistage, the connection device comprising: a device side output connector configured to be connected to one of others of the plurality of connection devices; a device side input connector configured to be connected to one of the printing apparatus and the device side output connector of one of the others of the plurality of connection devices; a signal line connecting the device side output connector to the device side input connector; a device side controller having the processor connected to the signal line between the electric resistance and the device side input connection, the device side input connector and the device side output connector being connected with each other through the electric resistance; a voltage level of a start command signal output from the printing apparatus being equal to or higher than a predetermined level, and the voltage level of the start command signal being reduced to be less than the predetermined level as it has passed through the electric resistance; a device side storage unit; and a device side communication circuit configured to communicate with the printing apparatus, the device side communication circuit electrically connecting the device side input connector to the device side controller;

the instructions cause the processor to:

execute an authentication process in cooperation with the printing apparatus when a signal is input to the device side controller, the signal corresponding to a start command signal which is output from the printing apparatus and is input to the electric resistance, wherein the device side controller executes the authentication process when it receives the start command signal of which voltage level is equal to or higher than the predetermined level, while the device side controller does not execute the authentication process when it receives the start command signal of which voltage level is lower than the predetermined level; and execute a level process in which a voltage level of the start command signal which has passed the electric resistance is set to be higher than or equal to the predetermined level when the authentication process is finished, wherein, in the printing apparatus, identification information assigned to each of the plurality of connection devices and number-of-stage information indicating, for each of the plurality of connection devices, which stage a connection device associated with the identification information is connected to is stored based on the authentication process and the level process, and wherein the identification information is associated with the number-of-stage information.

* * * * *